United States Patent Office 2,964,418
Patented Dec. 13, 1960

2,964,418

STABILIZER COMPOSITIONS AND THEIR PROCESS OF MANUFACTURE

Leonard M. Kebrich, Brooklyn, N.Y., assignor to National Lead Company, New York, N.Y., a corporation of New Jersey No Drawing. Filed Sept. 9, 1957, Ser. No. 682,612

6 Claims. (Cl. 106—243)

This invention relates to flushed pastes having heat and light stabilizing and plasticizing properties for resinous compositions, and to a process for their manufacture.

When a solid material, such as pigment, solid stabilizing agent for resins, filler material or the like is prepared in an aqueous system but is intended for use in an organic system such as an oleorisinous paint vehicle, vinyl resin composition or the like, the usual practice is to dewater the solid as far as practicable by filtration, decantation or similar means, and then to evaporate the resulting aqueous paste to dryness. The dry solid is then ground into the desired organic vehicle.

The term "flushed pastes" refers to paste compositions prepared somewhat differently, by a preferential dispersion process, as, for example, mixing or agitating an aqueous filter cake of a solid substance with an oily vehicle until the solid portions art dispersed in the oil phase and the aqueous phase separated from the oily paste. Such compositions and their process of manufacture are highly advantageous in many industrial applications. Where a flushing operation can be employed, there is an elimination of drying and grinding operations. In the event the solid substances are unstable, e.g., of an inflammable nature, there is substantially complete elimination of the fire hazard. In addition to this, there is a total elimination of the dusting problem. This latter aspect assumes considerable importance where the solid substances can cause severe irritations or are toxic, as is the case with most cadmium chemicals.

Another disadvantage involved in the usual practice of drying the filter cake by evaporation to produce a powdered product arises from the fact that any water-soluble salts present in the water-wet filter cake (which is normally about 50% solids—i.e. half water) are concentrated upon evaporation of the water and remain intimately mixed with the stabilizer. These salts thus find their way into the organic vehicle, e.g. a vinyl or other resin to which the stabilizer is added, and result in appreciable impairment of the electrical insulating properties of the resin. In some instances, moreover, the retained salts cause severe agglomeration of the solid particles during drying, forming aggregates which cannot be resolved by the finest dry grinding, and which impair subsequent dispersion in liquid media.

In view of the fact that in manufacturing flushed paste compositions grinding operations are dispensed with and that water-soluble salts are eliminated, it is possible where a flushing process can be used, to overcome the existing problem of producing consistently uniform stabilized resinous compositions.

Furthermore, packaged flushed paste compositions are much more compact than conventional packaged filter cake powders and organic vehicles. This affords a considerable saving of valuable storage space and a reduction of shipping costs.

Pigment-vehicle flushing processes have long been known to the painting arts, as exemplified by the manufacture of white lead paste in linseed oil. Not all substances, however, lend themselves to flushing processes. In some instances, the solids dispersed in one liquid medium are not preferentially wetted by the desired dispersing medium. In other instances, emulsions are formed by the liquid media which cannot be separated and which prevent the transfer of the solid substances from one liquid phase to the other. Furthermore, it has not heretofore been known that flushing techniques might be employed for the preparation of paste compositions having heat and light stabilizing and plasticizing properties for resinous compositions.

The principal object of this invention is to provide a novel process for the manufacture of paste compositions having heat and light stabilizing properties for resinous compositions.

Another object is to provide a process for the manufacture of paste compositions having heat and light stabilizing and plasticizing properties for resinous compositions.

A further object is to provide a process for the manufacture of flushed pastes by effecting a phase transfer of heat and light-stabilizing substances from an aqueous medium to an organic medium.

A particular object is to provide a manufactured flushed paste having heat and light stabilizing properties for resinous compositions.

A still further object is to provide a manufactured flushed paste having heat and light stabilizing and plasticizing properties for resinous compositions.

Additional objects and advantages will become apparent from the following detailed description of the invention and the appended claims.

According to the process of the invention, an aqueous filter cake of a basic cadmium salt of a fatty acid containing at least six carbon atoms is mixed or agitated with a substantially neutral water-immiscible organic vehicle, preferably a liquid plasticizer, thereby dispersing said cadmium salt in said organic vehicle, and the water portion of said aqueous filter cake is separated from said organic vehicle and the cadmium salt therein dispersed. As used herein, the term "filter cake" is taken to mean an aqueous paste resulting from filtration or equivalent operations, e.g., centrifugation, settling or the like.

Basic cadmium salts for use as stabilizers for vinyl resins, for example basic cadmium stearate, basic cadmium caprylate and basic cadmium oleate are normally manufactured in an aqueous medium. When these salts are concentrated by filtration, for example, they form a semi-solid filter cake, which generally contains 50% or more of water in addition to the solid portions therein. The heretofore usual practice has been to dry this filter cake to separate the solid portions, with all of the attendant disadvantages mentioned above.

Most conventional flushing operations necessitate the use of wetting or dispersing agents to facilitate the transfer of the dispersed solid from the aqueous to the organic medium. Using the particular basic cadmium soaps herein specified, however, it has been found that the phase transfer can ordinarily be accomplished without any added dispersing agent whatever. The reason is apparently that basic cadmium salts of fatty acids containing at least six carbon atoms in the fatty acid chain, while they are wettable in and dispersible by water, are preferentially wetted by organic vehicles. Other cadmium compounds, including cadmium salts of organic acids having less than six carbon atoms, do not appear to have the required balance of hydrophilic and organophilic properties required for complete phase transfer. The advantage of being able to dispense with the use of a wetting agent is considerable, in that it avoids the introduction of an additional component in the stabilizer system, which in turn simplifies the problems of the formulator in the design of compatible vinyl halide resin batches and the like.

By the term "vinyl halide resin" we mean to include the various vinyl resin compounds and combinations known to the art such as polyvinyl chloride, vinyl resins produced by conjointly polymerizing a vinyl halide with vinyl acetate or other vinyl ester, vinyl resins produced by conjoint polymerization with an acrylic compound, for instance ethyl methacrylate or methyl methacrylate, and co-polymers of a vinyl halide with other vinyl halide resin copolymers as vinylidene halide, and also vinylidene halide homopolymers.

The proportion of plasticizer or other vehicle added is not critical, but it should be present in sufficient quantity to permit complete dispersion therein of the solid portion of the filter cake. This amount will generally be a weight of plasticizer that is roughly equivalent to one-third of the weight of the solid portion of the filter cake. It has been observed that the above-mentioned basic cadmium salts are preferentially wetted by plasticizer vehicles, even in the absence of any auxiliary wetting agent.

The plasticizers that may be employed in this process include all of the ordinary ether- and ester-type plasticizers, but particularly preferred are the esters of polyesters of phthalic acid. Examples of such plasticizers include dicapryl phthalate, diisooctyl phthalate, and di-2-ethylhexyl phthalate. Other useful plasticizers include polyester adipate, polyglycols, triphenyl phosphite, bis-(2-ethylhexyl)-2-ethylhexyl phosphonate, etc. While it is preferred that the vehicle be a plasticizer, it is of course possible to employ other organic dispersing media, provided they are not such as to adversely affect the characteristics of the composition with respect to its intended use. Among such other organic vehicles may be mentioned hydrocarbons such as mineral oil, petroleum jelly and the like.

The cadmium salts operable according to the present process are the basic soaps of fatty acids having at least six carbon atoms. Typical of the cadmium compounds within the class are the basic cadmium salts of caproic acid, caprylic acid, lauric acid, capric acid, palmitic acid, undecylic acid, oleic acid, stearic acid, and behenic acid.

These basic cadmium compounds may be prepared by a metathesis at ordinary temperatures according to the following equation:

(a) $2CdSO_4 + 4NaOH + 2HR$
$\rightarrow CdO \cdot CdR_2 + 2Na_2SO_4 + 3H_2O$ or by neutralization in aqueous systems at about 40° C. by the reaction:

(b) $2CdO + XH_2O + 2HR \rightarrow CdO \cdot CdR_2 + (X+1)H_2O$ where R represents the aliphatic acid radical and X represents the number of molecules of water involved.

The latter process is best conducted in a heated pebble mill in an aqueous medium containing a small amount of water-soluble alcohol, glycol ether or the like, for example, secondary butanol, isobutanol, or ethylene glycol monobutyl ether. The alcohol serves to catalyze the neutralization and to form workable dispersions of the normally water-repellent products.

Some typical preparations of monobasic cadmium compounds are as follows:

I. MONOBASIC CADMIUM CAPRYLATE 51.4 grams (0.40 mol) of cadmium oxide and 57.7 grams (0.40 mol) of caprylic acid were reacted in a solution of 300 ml. of water and 25 ml. of isobutanol.

The reaction was conducted at 35° C.±5° for 24 hours in a porcelain pebble mill.

The white product, which after filtration and drying weighed 103.9 grams, was found to be a single-phase solid having an average refractive index of 1.56 and a density of 1.70 grams/cc.

II. MONOBASIC CADMIUM UNDECYLENDATE

A solution of 51.3 grams of cadmium sulfate $(3CdSO_4 \cdot 8H_2O)$ in 250 ml. water at 30° C. was gradually treated with a warm (50° C.) solution made by dissolving 39.0 grams of commercial grade undecylenic acid and 16 grams of sodium hydroxide in 100 ml. of water. The sparingly-soluble white product was recovered by filtration, thoroughly washed, and dried at 90° C. The yield was 57.3 grams and the cadmium content of the product amounted to 34.4%.

The products are unctuous white, insoluble solids which decompose, without melting, around 200° C. The following table lists typical compounds and their properties.

TABLE I.—TYPICAL MONOBASIC CADMIUM COMPOUNDS

| Monobasic Cadmium Compounds | Formula | Percent Cadmium | Density, g./cc. | Average Refractive Index |
| --- | --- | --- | --- | --- |
| Caproate | $CdO \cdot Cd(C_5H_{11}COO)_2$ | 47.7 | 1.93 | 1.56 |
| Caprylate | $CdO \cdot Cd(C_7H_{15}COO)_2$ | 42.6 | 1.70 | 1.56 |
| Pelargonate | $CdO \cdot Cd(C_8H_{17}COO)_2$ | 40.5 | 1.65 | 1.56 |
| Caprate | $CdO \cdot Cd(C_9H_{19}COO)_2$ | 38.5 | 1.56 | 1.55 |
| Undecylenate | $CdO \cdot Cd(C_{10}H_{21}COO)_2$ | 36.8 | 1.48 | 1.56 |
| Laurate | $CdO \cdot Cd(C_{11}H_{23}COO)_2$ | 35.2 | 1.47 | 1.55 |
| Myristate | $CdO \cdot Cd(C_{13}H_{27}COO)_2$ | 32.3 | 1.44 | 1.54 |

The basic cadmium salts of acids containing less than six carbon atoms however, are not readily dispersed in the organic media, and attempts to use them in the process of this invention result in emulsification or failure of the phase transfer, or both, either eventually resulting in failure to form a distinct, separable water phase. The monobasic cadmium compounds having no more than twenty-two carbon atoms are preferred, the higher compounds not being readily available.

It may be desirable in some cases to assist the phase transfer by raising the temperature of the charge, for example to about 50–90° C. and/or by adding to the charge a small amount (for example about 2 to 5 percent by weight of the organic vehicle) of an aliphatic alcohol, such as ethyl, propyl, isopropyl, butyl, isobutyl, hexyl, heptyl, or octyl alcohol or the like.

It should be noted in passing that alcohols are not wetting agents in the same sense in which that term is used above. The conventional wetting agents are compounds containing both polar and non-polar groups in the molecule, and function as "surface active" agents by a mechanism thought to involve dissolution or solvation of the polar portion of the molecule in the aqueous phase and simultaneous dissolution or solvation of the non-polar portion in the organic phase. While alchols contain both polar and nonpolar groups within the molecule, and such surface phenomena may occur to some extent, the alcohols are not known as particularly effective wetting agents, and their primary function in assisting phase transfer is believed to be simply that of increasing the mobility of the system, thus allowing the inherent organophilic properties of the basic cadmium soaps to exert their full effect.

The type of mixing apparatus to be employed in practicing the foregoing process is not critical. Any mixing means which produces a thorough blending action will facilitate the phase transfer of the filter cake solids to the liquid organic vehicle phase. It has been found convenient to employ a vibratory mixing apparatus which vibrates a closed vessel containing the materials to be mixed. In lieu of the vibratory mixer, a Baker-Perkins mixer having a kneading action may be employed. Employing such mechanical mixers, the process of this invention is capable of separating up to 90% and sometimes more of the water originally present in the filter cake. If it is desired to reduce the moisture content of the plasticizer paste produced in the mechanical mixer, it is a simple matter to couple the mixer with a vacuum apparatus and to gently heat the paste until all but traces of water are driven off.

The time of mixing also is not critical and can be determined from the degree of dispersion of the filter cake solids in the plasticizer phase. With vibrating mixers operating at 200–250 cycles per minute, 15 minutes of mixing will usually produce a complete transfer of the solid materials. The following examples illustrate the practice of the invention:

*Example I*

60 grams of monobasic cadmium caprylate filter cake containing 50.0% water were placed in a ½ pint can with 12.9 grams of di-2-ethylhexyl phthalate. The can was placed in a vibrating mixer and after 15 minutes of agitation, at about 200 cycles per minute, there was a complete dispersion of the solids in the plasticizer phase, and 80.0% of the water content of the system was decanted off.

A similar system employing mineral oil as the organic vehicle resulted in the complete dispersion of the solids in the mineral oil and 85% of the water content of the system was decanted off.

Another similar system using 70 grams of monobasic cadmium caprate filter cake containing 52.1% water, and employing as the organic liquid medium a mixture of 12 grams of a polyester of adipic acid and a glycol, having a molecular weight of approximately 3,500, and 6 grams of an epoxidized soybean oil, both industrially sold by the Rohm & Haas Company under the trademarks "Paraplex G–50" and "Paraplex G–60" respectively, resulted in the complete transfer of the solids to the plasticizer; decanted water measured 29 ml., representing 79.5% of the total amount of water in the system.

*Example II*

70 grams of monobasic cadmium caprate filter cake containing 55.9% water were placed in a ½ pint can with 13.2 grams of dicapryl phthalate. The can was placed in a vibrating mixer and after 15 minutes of agitation at about 200 cycles per minute there was a complete dispersion of the solids in the plasticizer phase and 76.7% of the water content of the system was decanted off.

In a similar system employing diisooctyl phthalate as the plasticizer, monobasic cadmium caprate solids were successfully displaced from the aqueous phase into the plasticizer phase.

*Example III*

90 grams of monobasic cadmium laurate filter cake containing 66.2% water were placed in a ½ pint can with 13 grams of mineral oil. The can was placed in a vibrating mixer and after fifteen minutes of agitation at about 200 cycles per minute there was a complete dispersion of the solids in the mineral oil; 77.2% of the water content of the system was decanted off.

*Example IV*

65 grams of monobasic cadmium stearate filter cake containing 59.3% water were placed in a ½ pint can with 11.3 grams of an epoxidized soybean oil industrially sold by Rohm & Haas Company under the trademark "Paraplex G–60." The can was placed in a vibrating mixer and after 15 minutes of agitation, at about 200 cycles per minute, there was a complete dispersion of the solids in the plasticizer and 51.8% of the water content of the system was decanted off.

*Example V*

89.5 grams of monobasic cadmium oleate filter cake containing 40% water were placed in a ½ pint can with 28.9 grams of di-2-ethylhexylphthalate. After the can underwent agitation, in a 200 cycles per minute vibrating mixer for 15 minutes, it was found that there was a complete dispersion of the solids in the plasticizer and 76.8% of the water content of the system was decanted off.

*Example VI*

50 grams of a filter cake comprising 55% water and the remainder the monobasic cadmium salt of behenic acid—monobasic cadmium behenate—were placed in a vibrating mixer with 9.6 grams of diisooctyl phthalate and shaken for 15 minutes at 200 cycles per minute. At the termination of the mixing operation the phase transfer of the filter cake solids was complete and 65.5% of the water originally contained in the system was decanted from the plasticizer paste.

In a similar system employing di-2-ethylhexyl phthalate as the plasticizer the monobasic cadmium behenate was readily transferred under the same conditions.

The flushed paste compositions prepared in all of the foregoing examples were subsequently employed as stabilizers and plasticizers in a polymeric composition of 95% vinyl chloride and 5% vinyl acetate. The evaluations obtained in the testing of this particular vinyl resin, as to its stabilization and plasticization are industry-accepted as indicative of the results which will be obtained in connection with other homopolymer and copolymer vinyl resins. The amounts of basic cadmium salts used in the vinyl resin were between 1 and 2% by weight of the resin. The flushed cadmium salts may be utilized as stabilizers and plasticizers in conjunction with other known stabilizers as well be obvious to those skilled in the art.

Tests conducted on the resulting plastic products indicated that the flushed paste compositions imparted excellent stabilization properties to the vinyl resins.

It is evident from the foregoing description and examples that basic cadmium salts of fatty acids having 6 or more carbon atoms may be transferred from an aqueous phase to an organic vehicle phase by simple mixing, without necessitating the presence of additional wetting or surface-active agents, thereby producing highly desirable flushed paste compositions having excellent stabilizing properties for resinous compositions. These pastes are stable for extended periods of time, having remained on the shelf as long as two years without apparent change.

While the compositions of this invention are particularly useful as stabilizing and plasticizing agents for resinous compositions, many of them are potentially useful for other purposes also. Thus, flushed pastes of basic cadmium stearate in mineral oil have excellent lubricating qualities.

The foregoing description and detailed examples of the invention are for the purpose of illustration and no undue limitation should be deduced therefrom.

I claim:
1. A process for preparing a flushed paste having heat stabilizing properties for resinous compositions which comprises the steps of agitating an aqueous filter cake of basic cadmium salt of a fatty acid having at least 6 carbon atoms with a substantially neutral, water-immiscible liquid organic plasticizer, said basic cadmium salt being insoluble in said plasticizer, said plasticizer being present in amount sufficient to permit complete dispersion of the solid portion of said filter cake in said plasticizer, thereby dispersing said basic cadmium salt in said organic plasticizer, and separating the water portion of said aqueous filter cake from said organic plasticizer and said basic cadmium salt therein dispersed.

2. A process for preparing a flushed paste having heat stabilizing and plasticizing properties for resinous compositions which comprises the steps of agitating an aqueous filter cake of a basic cadmium salt of a fatty acid having at least 6 carbon atoms with a substantially neutral, water-immiscible liquid organic plasticizer selected from the group consisting of ester and ether type plasticizers, said basic cadmium salt being insoluble in said plasticizer, said plasticizer being present in amount sufficient to permit complete dispersion of the solid portion of said filter cake in said plasticizer, thereby dispersing said cadmium salt in said plasticizer, and separating the water portion of said aqueous filter cake from said organic plasticizer and said basic cadmium salt therein dispersed.

3. A process for preparing a flushed paste having heat stabilizing properties for resinous compositions which comprises the steps of agitating an aqueous filter cake of a basic cadmium salt of a fatty acid having at least 6 carbon atoms with a substantially neutral, water-immiscible liquid organic plasticizer, said basic cadmium salt being insoluble in said plasticizer, and a small proportion of an aliphatic alcohol having from 3 to 8 carbon atoms, thereby dispersing said basic cadmium salt in said organic plasticizer, and separating the water portion of said aqueous filter cake from said organic plasticizer and said basic cadmium salt therein dispersed.

4. A process for preparing a flushed paste having heat stabilizing properties for resinous compositions which comprises the steps of agitating an aqueous filter cake of a basic cadmium salt of a fatty acid having at least 6 carbon atoms with substantially neutral, water-immiscible liquid organic plasticizer, said basic cadmium salt being insoluble in said plasticizer, said agitation being carried out at a temperature between 50 and 90° C., thereby dispersing said basic cadmium salt in said organic plasticizer, and separating the water portion of said aqueous filter cake from said organic plasticizer and said basic cadmium salt therein dispersed.

5. A flushed paste composition having heat stabilizing properties for resinous compositions consisting essentially of a substantially neutral, water-immiscible liquid organic plasticizer, and a basic cadmium salt of a fatty acid having at least 6 carbon atoms, said basic cadmium salt being insoluble in said plasticizer, said organic plasticizer being present in amount sufficient to disperse said salt.

6. A flushed paste composition having heat stabilizing and plasticizing properties for resinous compositions consisting essentially of a substantially neutral, water-immiscible liquid organic plasticizer selected from the group consisting of ester and ether type plasticizers and a basic cadmium salt of a fatty acid having at least 6 carbon atoms, said basic cadmium salt being insoluble in said plasticizer, said plasticizer being present in amount sufficient to disperse said salt.

References Cited in the file of this patent
UNITED STATES PATENTS

| 2,236,296 | Irvington et al. | Mar. 25, 1941 |
| 2,252,702 | Gurado | Aug. 19, 1941 |
| 2,528,429 | Elliott et al. | Oct. 31, 1950 |
| 2,807,553 | Fischer | Sept. 24, 1957 |

OTHER REFERENCES

Johnson: "Flushed Colors," Canadian Paint and Varnish Magazine, December 1948, pages 10–11 and 49.